United States Patent
Choi et al.

(10) Patent No.: US 7,085,212 B2
(45) Date of Patent: Aug. 1, 2006

(54) DISK CARTRIDGE AND DISK DRIVE APPARATUS

(75) Inventors: Han-kook Choi, Suwon (KR); Yong-hoon Lee, Suwon (KR); Seok-jung Kim, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 424 days.

(21) Appl. No.: 09/794,389

(22) Filed: Feb. 28, 2001

(65) Prior Publication Data

US 2002/0051413 A1    May 2, 2002

(30) Foreign Application Priority Data

Nov. 1, 2000    (KR) .................................. 00-64556

(51) Int. Cl.
G11B 7/00      (2006.01)
G11B 23/03    (2006.01)

(52) U.S. Cl. ...................... 369/53.2; 720/729
(58) Field of Classification Search ............... 369/53.2, 369/53.22, 290, 13.36, 13.39; 360/132, 69
See application file for complete search history.

(56) References Cited

U.S. PATENT DOCUMENTS 5,289,451 A * 2/1994 Ashinuma et al. ....... 369/53.22
6,067,214 A   5/2000 Thomas, III
6,091,563 A * 7/2000 Thomas et al. ............. 360/132
6,175,471 B1 * 1/2001 Meguro ...................... 360/133
6,297,923 B1 * 10/2001 Burnside et al. .............. 360/69

FOREIGN PATENT DOCUMENTS

| EP | 0 565 281 A2 | 3/1993 |
| JP | 61283087 A * | 12/1986 |
| JP | 09213053 A * | 8/1997 |
| JP | 11-500560 | 1/1999 |
| JP | 11031355 A * | 2/1999 |
| WO | WO 00/30020 | 5/2000 |

OTHER PUBLICATIONS

Patent Abstract of Japanese Publication No. 04061650, with publication date Feb. 27, 1992.
Patent Abstract of Japanese Publication No. 06187719, with publication date Jul. 8, 1994.
Patent Abstract of Japanese Publication No. 61175985, with publication date Aug. 7, 1986.

* cited by examiner

*Primary Examiner*—Thang V. Tran
(74) *Attorney, Agent, or Firm*—Stein, McEwen & Bui, LLP (57) ABSTRACT

A disk cartridge and a disk drive apparatus. The disk cartridge has a reflector to identify the type of disk, and the disk drive apparatus has an optical emitter/detector to irradiate light on the reflector and detect light reflected from the reflector to identify the type of disk. A large number of identification marks can be provided by changing the angle of reflection and the amount of light reflected from the reflector. Accordingly, disks of various capacities, products and formats can be individually identified.

35 Claims, 5 Drawing Sheets

DISK CARTRIDGE AND DISK DRIVE APPARATUS

CROSS-REFERENCE TO RELATED APPLICATION

This application claims the benefit of Korean Application No. 00-64556, filed Nov. 1, 2000, in the Korean Patent Office, the disclosure of which is incorporated herein by reference.

BACKGROUND OF THE INVENTION

1. Field of the Invention

The present invention relates to a disk cartridge accommodating an information recording/reproducing disk and a disk drive apparatus to record or reproduce information on or from the disk. More particularly, the present invention relates to a disk cartridge and a disk drive apparatus having an improved identifying device to identify the disk type.

2. Description of the Related Art

A present design for a recording medium for multimedia such as audio and video includes a cartridge which rotatably accommodates a recording/reproducing medium such as an optical disk or an optical magnetic disk so that the disk can be used in a disk drive apparatus. The development of multimedia requires a larger capacity of a disk cartridge, and as a result a variety of disk cartridges with an improved recording density have been developed. For example, in the case of a digital versatile disk-random access memory (DVD-RAM), there are a variety of disk cartridges having different recording densities. These varieties include a normal one-sided disk on which information can be recorded on only one surface; a double-sided disk on which information can be recorded on both surfaces; a one-sided double recording layer disk having a double recording layer on one surface so that information can be recorded on each layer; a double-sided double recording layer disk having a double recording layer on both surfaces; and a one-sided disk having a narrower track pitch than the normal one-sided disk.

A recording and reproducing method of a disk drive apparatus changes depending on the recording density. In other words, a disk drive apparatus uses a different method when recording and reproducing information to and from a disk depending on the structure of a track pitch or a recording layer type (a single layer or a double layer). Accordingly, a structure for identifying the type of disk cartridge loaded to the disk drive apparatus is required.

Figure 1:
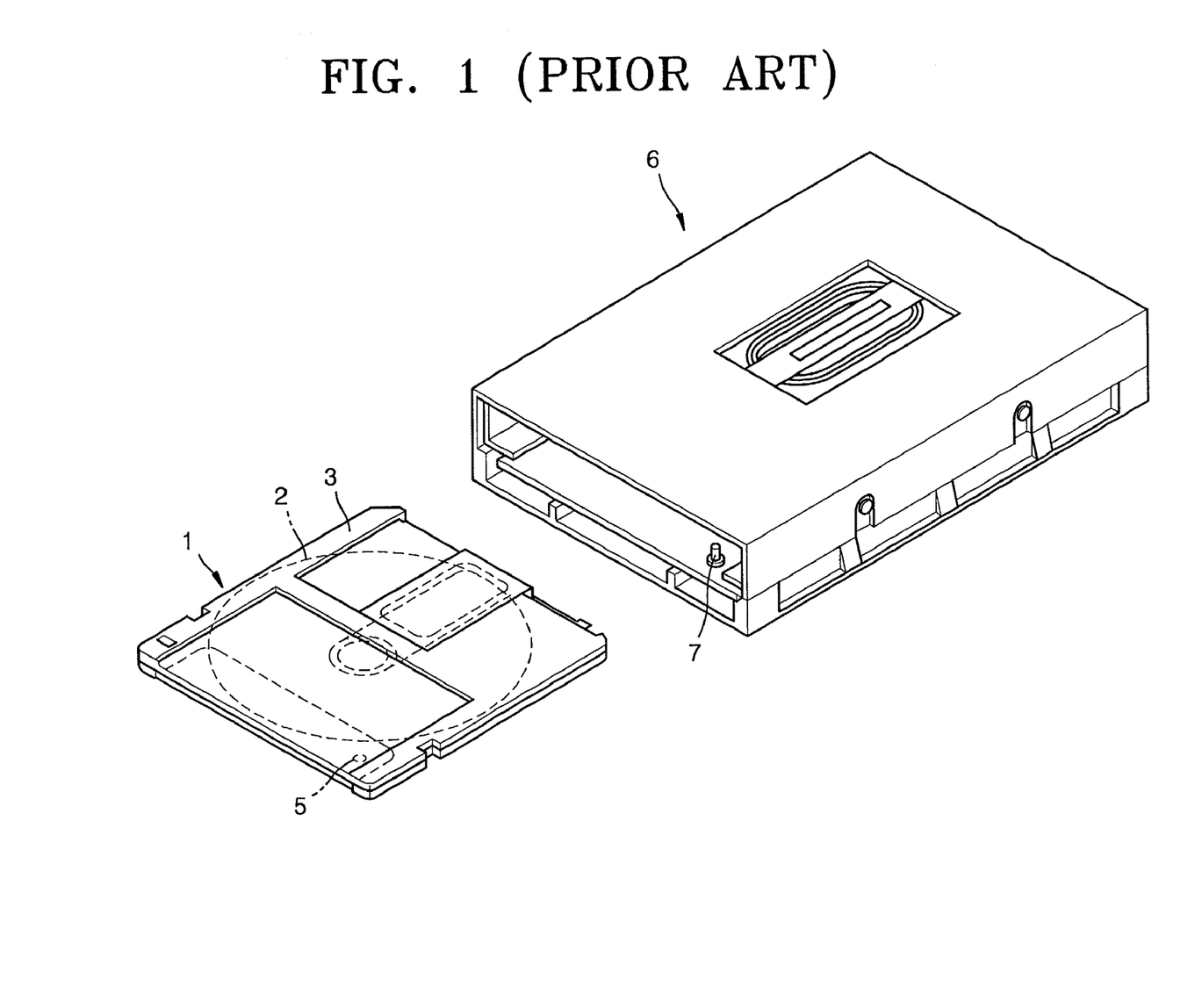
FIG. 1 is a perspective view illustrating a disk cartridge and a disk drive apparatus which have a known disk identification mechanism.

FIG. 1 discloses a known structure for identifying the type of disk, as disclosed in Japanese Patent Publication No. hei 11-120733. Referring to FIG. 1, an identification magnet 5 to indicate a large capacity is installed on a disk cartridge 1 rotatably accommodating a disk 2 in a case 3. A disk drive apparatus 6 is provided with a magnetism sensor 7 to sense the magnet 5. When the disk cartridge 1 is loaded into the disk drive apparatus 6, the magnetism sensor 7 senses a magnetic force of the identification magnet 5, and determines that the disk cartridge 1 has a large capacity and transmits the determined result to a controller (not shown) of the disk drive apparatus 6 so that control suitable for the type of the disk cartridge 1 is performed. On the other hand, the identification magnet 5 is not installed on a disk cartridge having a small capacity. Thus, no magnetic force is sensed by the magnetism sensor 7 when the disk cartridge of a low capacity is loaded into the disk drive apparatus 6, thus it is determined that the currently loaded disk cartridge has a small capacity.

Since the known method identifies the type of disk cartridge 1 based on an on/off state of the magnetism sensor 7 depending on the existence/non-existence of the identification magnet 5, only two types of disks cartridges 1, for example, a large capacity and a small capacity, can be identified. Accordingly, to identify various types of disk cartridges 1 as described above with this known structure, it would be necessary to change the number of identification magnets 5 depending on the type of disk cartridge 1, install as many magnetism sensors 7 as the maximum number of identification magnets 5, and determine the type of disk cartridge 1 based on how many times the magnetism sensor 7 is turned on. Alternately, it would be necessary to install a identification magnet 5 having a different magnetic force depending on the type of disk cartridge 1, and to construct the magnetism sensor 7 with a circuit to accurately identify the strength of the magnetic force instead of a simple on/off structure.

However, increasing the number of identification magnets 5 and magnetism sensors 7 makes it difficult to realize a small and light disk drive apparatus, increases the manufacturing cost and reduces productivity. Furthermore, a structure that identifies the type of disk cartridge based on the strength of the magnetic force requires construction of an accurate circuit. Still further, when the magnetic force of the magnet is degraded, the type of disk cartridge may be erroneously identified. Therefore, a disk cartridge and a disk drive apparatus which have a simple structure allowing various types of disk cartridges to be identified are desired.

SUMMARY OF THE INVENTION

Accordingly, it is an object of the present invention to provide an improved disk cartridge and a disk drive apparatus having a simple structure to identify the various types of disk cartridges.

It is another object of the present invention to provide an improved disk cartridge having a lower manufacturing cost.

Additional objects and advantages of the invention will be set forth in part in the description which follows, and, in part, will be obvious from the description, or may be learned by practice of the invention.

The foregoing and other objects of the present invention are achieved by providing a disk cartridge having a case to rotatably accommodate a disk as an information recording medium. The disk cartridge includes a reflector disposed on the case. The reflector reflects incident light to a predetermined optical emitter/detector to allow the type of disk to be identified based on the reflected light.

The foregoing objects may also be achieved by providing a disk drive apparatus including a recording/reproducing unit to record and reproduce information to and from a disk of a disk cartridge, and an optical emitter/detector to irradiate light on a reflector provided on the disk cartridge and to detect light reflected from the reflector to identify the type of disk.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Reference will now be made in detail to the present preferred embodiments of the present invention, examples of which are illustrated in the accompanying drawings, wherein like reference numerals refer to like elements throughout.

Figure 2:
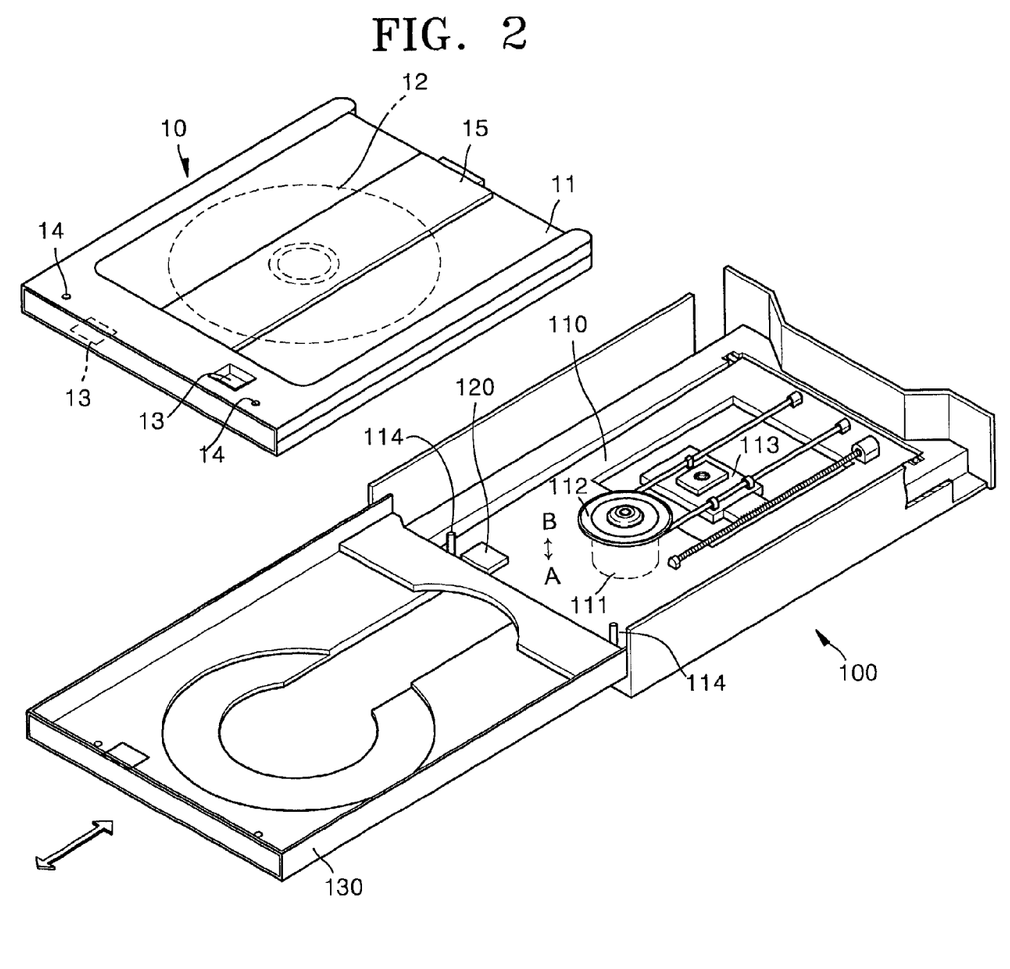
FIG. 2 is a perspective view illustrating a disk cartridge and a disk drive apparatus which have a disk identification mechanism according to a first embodiment of the present invention.

FIGS. 2 through 5 illustrate disk cartridges and disk drive apparatuses with a disk identification mechanism according to a first embodiment of the present invention. Referring to FIG. 2, a disk cartridge 10, comprises a case 11 to accommodate a disk 12, which serves as an information recording and reproducing medium. Reflectors 13 to reflect incident light from a predetermined light source (not shown) are provided on both the top and bottom surfaces of the disk cartridge 10. The reflectors 13 are provided to identify a type of the disk 12 and is formed by attaching or directly printing a label capable of reflecting light, or by coating the disk with a reflecting film of a material such as aluminum. The reflectors 13 have a different angle depending on the type of disk 12. In other words, reflectors 13a can be parallel with the horizontal surface of the case 11 (see FIG. 3). Alternately, reflectors 13b or 13c can be used which have a predetermined slope with respect to the horizontal surface of the case 11 (see FIG. 4 or 5). Since reflected light changes with a reflection angle, the type of disk can be identified by sensing this change. This mechanism will be described later in detail. Reference numeral 14 denotes position decision holes in which position decision pins 114 of a disk drive apparatus 100 are inserted, and reference numeral 15 denotes an opening/closing shutter.

The disk cartridge 10 is placed on a tray 130 and inserted into the disk drive apparatus 100. A moving chassis 110 is installed to the disk drive apparatus 100 and moves in directions A and B (as indicated by the arrows) by a predetermined cam (not shown). On the moving chassis 110 are mounted a turntable 112 on which the disk 12 placed, a spindle motor 111 to rotate the turntable 112 and a recording/reproducing unit including an optical pickup 113 to record and reproduce information to and from the disk 12, and an optical emitter/detector 120 to irradiate light on the reflectors 13, to detect light reflected from the reflectors 13 and to identify the type of the disk 12. The moving chassis 110 moves down in the A direction when the tray 130 comes out as shown in FIG. 2. The moving chassis 110 moves up in the B direction when the tray 130 goes in. At this time, the disk 12 of the disk cartridge 10 is placed on the turntable 112, and the position decision pins 114 are inserted into the position decision holes 14.

Figure 3:
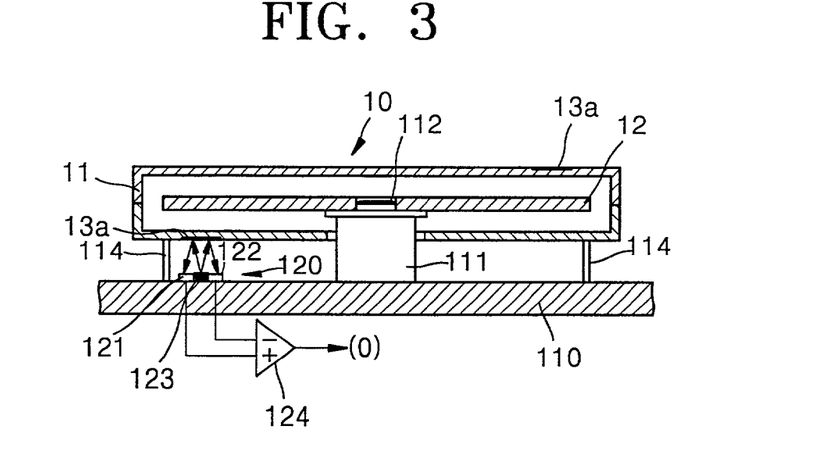
FIG. 3 is a side view illustrating the disk cartridge according to FIG. 2, in which the reflector is parallel to the optical emitter/detector.
Figure 4:
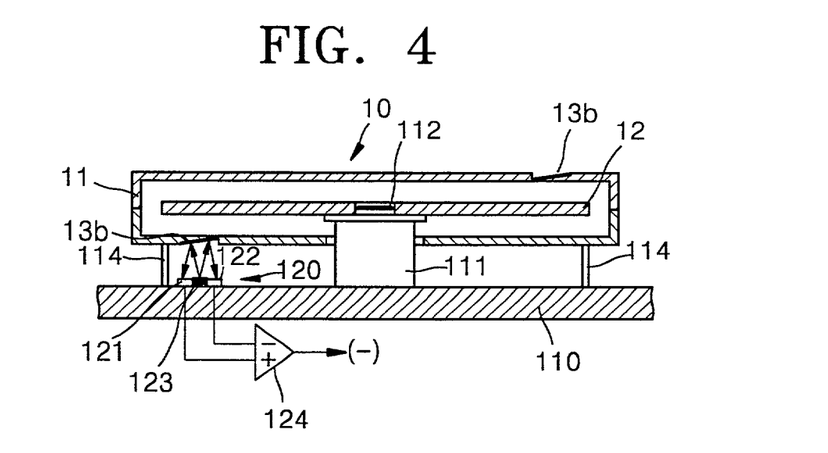
FIG. 4 is a side view illustrating the disk cartridge according to FIG. 2, in which the reflector slants upward to the right.
Figure 5:
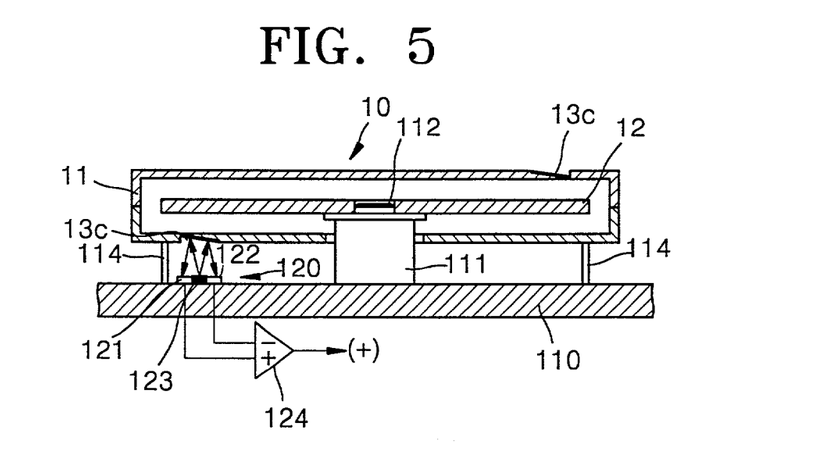
FIG. 5 is a side view illustrating the disk cartridge according to FIG. 2, in which the reflector slants upward to the right.
Figure 6:
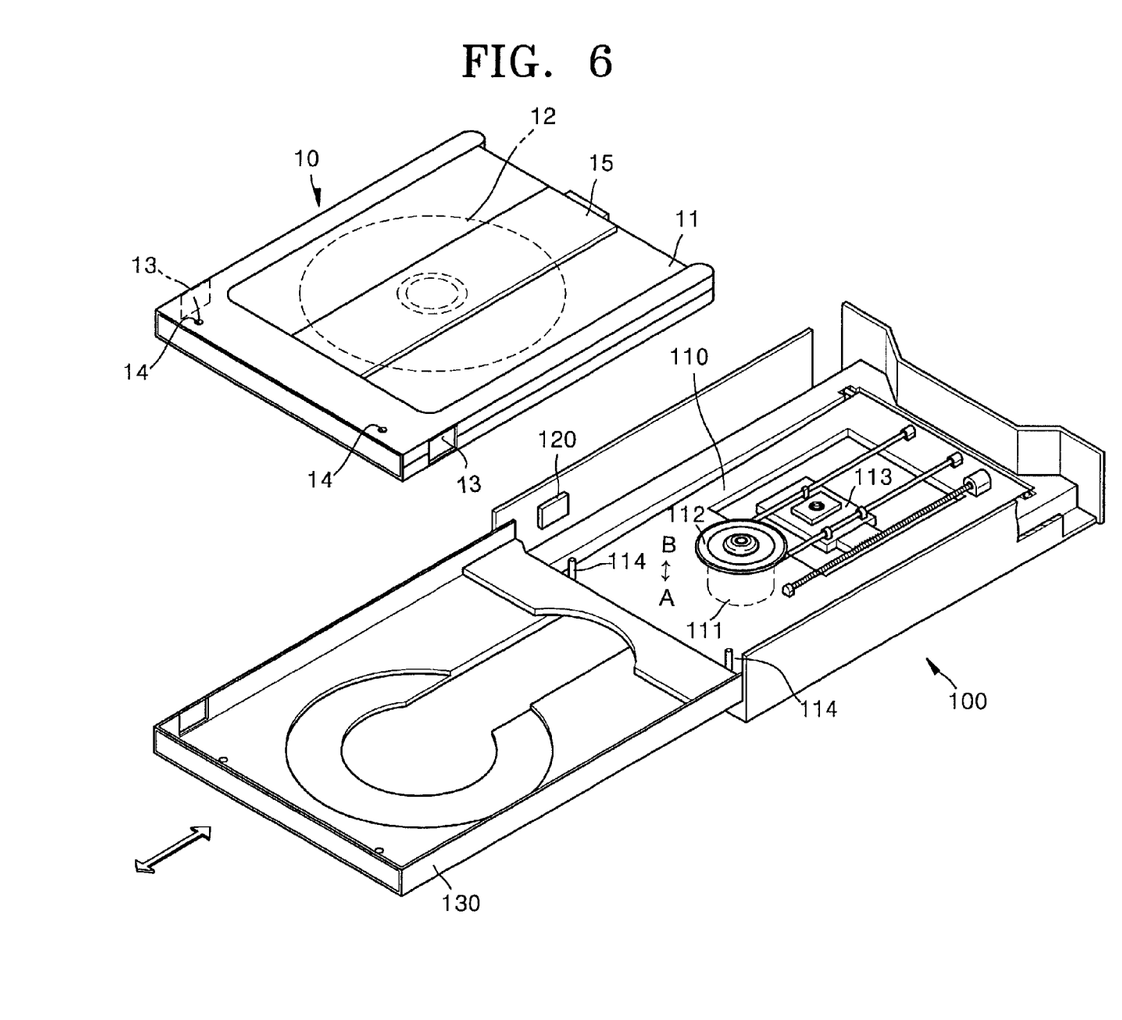
FIG. 6 is a perspective view illustrating a disk cartridge and a disk drive apparatus which have a disk identification mechanism according to a second embodiment of the present invention.

As shown in FIGS. 3 through 5, the optical emitter/detector 120 is positioned below the reflectors 13 (13a, 13b or 13c) when the disk cartridge 10 is installed in the disk drive apparatus 100. The optical emitter/detector 120 includes a light emitting diode (LED) 123 and first and second photodetectors 121 and 122 symmetrically disposed at both sides of the LED 123. Signals detected by the first and second photodetectors 121 and 122 are summed up by a differential amplifier 124 and output as a predetermined resultant value ("0", "−" or "+").

An operation to identify a disk using the reflector 13 and the optical emitter/detector 120 is as follows. Once the disk cartridge 10, loaded on the tray 130, is inserted into the disk drive apparatus 100, the moving chassis 110 moves up in the 'B' direction so that the disk 12 is placed on the turntable 112. Here, the optical emitter/detector 120 is positioned below the reflector 13. First, the case of the disk cartridge 10 having a reflector 13a parallel to the optical emitter/detector 120, as shown in FIG. 3, will be described. Once the LED 123 irradiates light on the reflector 13a, light reflected from the reflector 13a is symmetrically incident upon the first photodetector 121 and the second photodetector 122. That is, the first photodetector 121 receives the same amount of light as the second photodetector 122. Accordingly, the output of the differential amplifier 124 is "0." As a result, the disk drive apparatus 100 recognizes that the disk 12 of the currently installed disk cartridge 10 is an 'A' type disk having the parallel reflector 13a as an identification mark.

In the case of the disk cartridge 10 having a reflector 13b slanting upward to the right, as shown in FIG. 4, light irradiated from the LED 123 is not symmetrically reflected from the reflector 13b to the first and second photodetectors 121 and 122. Instead, a larger volume of light is incident upon the second photodetector 122. Accordingly, the output of the differential amplifier 124 has a minus ("−") value. This means that the disk cartridge 10 has a 'B' type disk having the reflector 13b slanting upward to the right as an identification mark.

When a reflector 13c slants upward to the left, as shown in FIG. 5, light irradiated from the LED 123 is not symmetrically reflected from the reflector 13c to the first and second photodetectors 121 and 122. Instead, a larger volume of light is incident upon the first photodetector 121. Accordingly, the output of the differential amplifier 124 has a plus ("+") value. This means that the disk cartridge 10 has a 'C' type disk having the reflector 13c slanting upward to the left as an identification mark.

When different angles of reflection are realized by changing the slant of the reflector 13, different resultant values are output. Thus, when disk types are matched to the different angles of reflection, the different angles of reflection effectively act as identification marks.

When varying the amount of light reflected from the reflectors 13 in addition to varying the angle of reflection, additional disk types can be identified. In other words, a different amount of light may be reflected from the reflectors 13 even at the same angle of reflection when, for example, a different color is applied to the reflectors 13. Then, the scale of the output value of the differential amplifier 124 changes so that another disk type can be identified. The case of a parallel reflector is an exception since the output value is still "0" even if the scale changes. To vary the amount of light reflected from the reflectors 13, a different color may be applied to the reflectors 13, as described above, or a different material may be applied, or the area of the reflectors 13 may be changed. Accordingly, by changing the amount of reflected light, each of the various types of disk are accurately identified. In particular, by combining the method of changing the amount of reflected light with the method of changing the angle of reflection, the number of output values can be considerably increased without adding a special apparatus, thereby identifying all of the various disk types.

In this embodiment, the reflectors 13 (13a, 13b or 13c) are disposed on the top and bottom surfaces of the case 11 because the disk 12 may be a double-sided disk. In the case of a double-sided disk, even if the disk cartridge 10 is turned upside down and inserted into the disk drive apparatus 100, the same identification operation as described above can be performed by the optical detector 120. In the case of a one-sided disk, if the cartridge is turned upside down and inserted, the type of disk cannot be detected, thereby generating an error message. Accordingly, a user is notified that the disk cartridge is inserted upside down.

FIGS. 6 through 9 illustrate disk cartridges and disk drive apparatuses with a disk identification mechanism according to a second embodiment of the present invention. The second embodiment has essentially the same structure as the first embodiment, with the exception that a reflector 13 (13d, 13e or 13f) is formed on the left and right sides of the disk cartridge 10, and accordingly, an optical detector 120 is formed on the sidewall of the disk drive apparatus 100.

Figure 7:
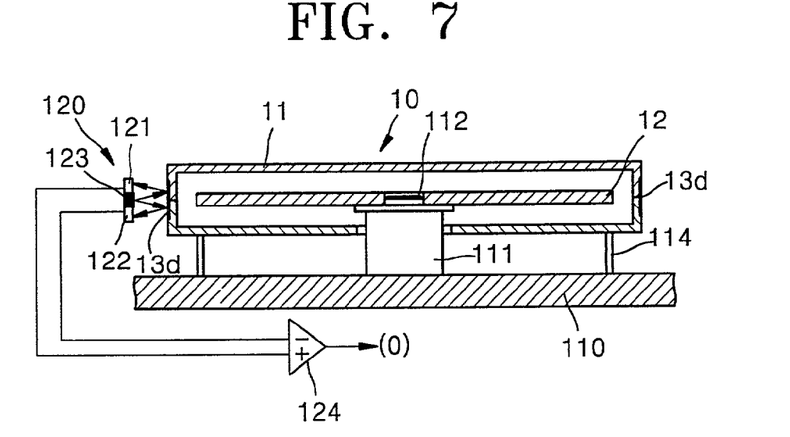
FIG. 7, is a side view illustrating the disk cartridge and disk drive apparatus according to FIG. 6, in which the reflector is parallel to the optical emitter/detector.

In the above structure, once the disk cartridge 10, loaded on a tray 130, is inserted into the disk drive apparatus 100, the moving chassis 110 moves up in the B direction so that the disk 12 is placed on the turntable 112. Here, the optical emitter/detector 120 is positioned at the side of the reflector 13. First, in the case where a reflector 13d is formed to be parallel to the optical emitter/detector 120, as shown in FIG. 7, light irradiated from a LED 123 to the reflector 13d is reflected and is symmetrically incident upon a first photodetector 121, and a second photodetector 122. Accordingly, the output of the differential amplifier 124 is "0." Based upon this output, the disk drive apparatus 100 recognizes that the disk 12 is an 'A' type disk having the parallel reflector 13d as an identification mark.

Figure 8:
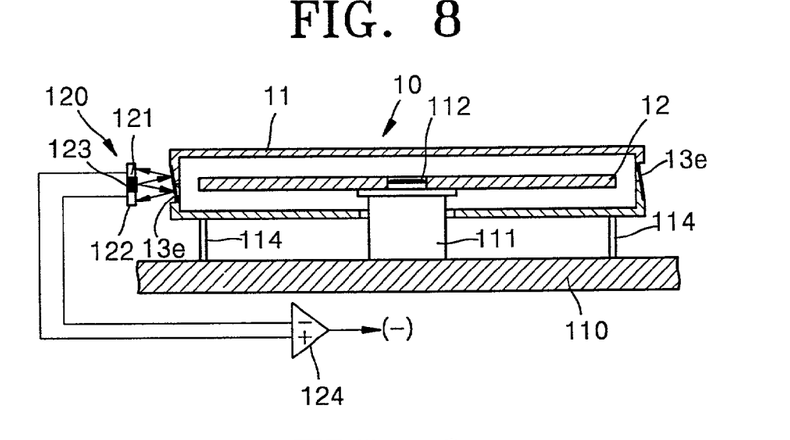
FIG. 8 is a side view illustrating the disk cartridge according to FIG. 6, in which the reflector slants upward to the right.

When a reflector 13e slants downward to the right, as shown in FIG. 8, light irradiated from the LED 123 is not symmetrically reflected from the reflector 13e to the first and second photodetectors 121 and 122, but the larger amount of light is incident upon the second photodetector 122. Accordingly, the output of the differential amplifier 124 has a minus ("−") value. Based upon this output, the disk drive apparatus 100 recognizes that the disk cartridge 10 has a 'B' type disk having the reflector 13e slanting downward to the right as an identification mark.

Figure 9:
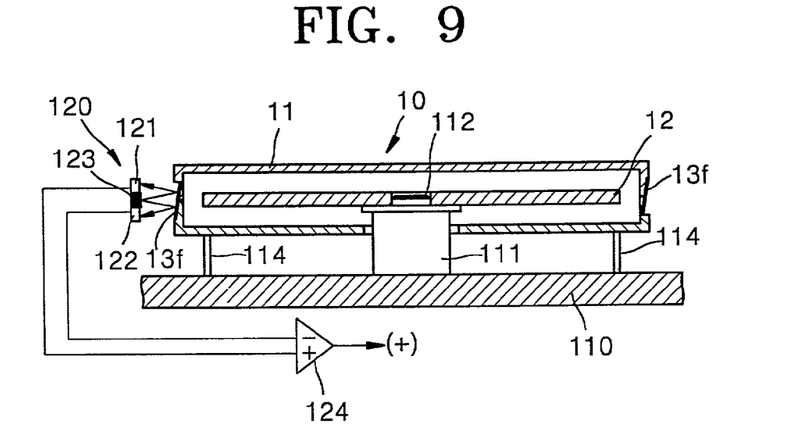
FIG. 9 is a side view illustrating the disk cartridge according to FIG. 6, in which the reflector slants upward to the right.

When a reflector 13f slants downward to the left, as shown in FIG. 9, the larger volume of light is incident upon the first photodetector 121. Accordingly, the output of the differential amplifier 124 has a plus ("+") value. Based upon this output, the disk drive apparatus 100 recognizes that the disk cartridge 10 has a 'C' type disk having the reflector 13f slanting downward to the left as an identification mark.

Like the first embodiment, the amount of reflected light can be changed by applying different materials, sizes or colors to the reflector in addition to a change in the angle of reflection, so that numerous different disk types (i.e., capacities, products, formats) can be identified without adding a special apparatus.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A disk cartridge to accommodate various types of disks as information recording mediums, comprising:
    a case to rotatably accommodate the disk;
    a light source to generate light;
    an optical detector; and
    a reflector, disposed on the case, to reflect first and second amounts of the light from the light source toward the optical detector to allow the type of disk to be identified based on a difference between the first and second amounts.

2. The disk cartridge of claim 1, wherein the reflector has a different angle of reflection depending on the type of the disk, so that the reflected light detected by the optical detector is different depending on the type of the disk.

3. The disk cartridge of claim 1, wherein the reflector reflects a different amount of the light depending on the type of the disk so that the reflected light detected by the optical detector is different depending on the type of the disk.

4. The disk cartridge of claim 3, wherein the reflector has a different reflection area depending on the type of the disk.

5. The disk cartridge of claim 3, wherein the reflector has a different color depending on the type of the disk.

6. The disk cartridge of claim 1, wherein the reflector is a label attached to or printed on the case, or a reflective film coated on the case, to reflect the light.

7. The disk cartridge of claim 1, wherein the reflector is provided on at least one of the top and bottom surfaces of the case.

8. The disk cartridge of claim 1, wherein the reflector is provided on at least one of the right and left sides of the case.

9. A disk drive apparatus to accommodate various types of disks in a disk cartridge comprising:
    a recording/reproducing unit to record and/or reproduce information to and/or from the disk of the disk cartridge; and
    an optical emitter/detector to irradiate light on a reflector, the reflector having a color applied thereto and being configured to reflect first and second amounts of colored light, the reflector being provided on the disk cartridge to reflect the first and second amounts of the colored light from the light source toward the optical detector to allow the type of disk to be identified based on a difference between the first and second colored amounts.

10. The disk drive apparatus of claim 9 wherein the optical emitter/detector comprises:
    a light emitting diode to emit the light; and
    a first receiving photodetector to receive the reflected light.

11. The disk drive apparatus of claim 10 further comprising a second receiving photodetector, wherein the first and second receiving photodetectors are symmetrically disposed at opposite sides of the light emitting diode.

12. A mechanism to identify a type of a disk of a disk cartridge, wherein a reflector to identify the type of the disk is installed on the disk cartridge, the reflector having a color applied thereto to reflect first and second particular amounts of colored light, the amounts of reflected light being associated with the type of disk, and a disk drive apparatus to record and/or reproduce information to and/or from the disk comprises an optical emitter/detector to irradiate light on the reflector and to detect the first and second amounts of reflected colored light reflected from the reflector to identify the type of the disk from a difference between the first and second amounts of colored light.

13. A disk cartridge to accommodate various types of disks as information recording mediums, comprising:
   a case to rotatably accommodate the disk;
   a light source to generate light;
   an optical detector; and
   a reflector, disposed on the case, to reflect the light from the light source toward the optical detector in a pattern associated with a type of disk to allow the type of disk to be identified based on the pattern, wherein a slant of the reflector relative to the light source depends on the type of the disk.

14. The disk cartridge of claim 3, wherein a reflectivity of the reflector is different depending on the type of the disk.

15. The disk cartridge of claim 13, wherein a reflectivity of the reflector is different depending on the type of the disk.

16. The disk cartridge of claim 1, wherein the reflector reflects a different amount of the light depending on the type of the disk so that the reflected light detected by the optical detector is different depending on the type of the disk.

17. A disk cartridge to accommodate a disk as an information recording medium, comprising:
   a case to rotatably accommodate the disk;
   a light source to generate light;
   an optical detector; and
   a reflector disposed on the case, the reflector reflecting the light from the light source to the optical detector to allow a type of the disk to be identified based on an area, an angle, or a color of the reflected light,
   wherein the reflector has a different angle of reflection depending on the type of the disk, so that the reflected light detected by the optical detector is different depending on the type of the disk, and the optical emitter/detector comprises:
      a light emitting diode,
      a first photodetector, and
      a second photodetector,
   the first and second photodetectors being on opposite sides of the light emitting diode.

18. A disk cartridge to accommodate a disk as an information recording medium, comprising:
   a case to rotatably accommodate the disk;
   a light source to generate light;
   an optical detector; and
   a reflector disposed on the case, the reflector reflecting the light from the light source to the optical detector to allow a type of the disk to be identified based on an area, an angle, or a color of the reflected light,
   wherein the reflector reflects a different amount of the light depending on the type of the disk so that the reflected light detected by the optical detector is different depending on the type of the disk, and the optical emitter/detector comprises:
      a light emitting diode,
      a first photodetector, and
      a second photodetector,
   the first and second photodetectors being on opposite sides of the light emitting diode.

19. The disk cartridge of claim 17, wherein the optical emitter/detector comprises:
   a light emitting diode;
   a first photodetector; and
   a second photodetector,
   wherein the first and second photodetectors are on opposite sides of the light emitting diode.

20. A disk drive apparatus to receive various types of disks, comprising:
   a light source to generate light;
   a reflector, having a color applied thereto, to reflect first and second amounts of the light, the amounts of reflected light being associated with a type of disk; and
   a detector to receive the first and second amounts of the reflected light to detect an area, an angle, or a difference between the amounts of the reflected light and to identify a recording density based upon the detected area, the detected angle, or the detected difference between the amounts of the reflected light.

21. A disk drive apparatus to receive various types of disks, comprising:
   a light source to generate light;
   a reflector, having a color applied thereto, to reflect an amount of the light, the amount of reflected light being associated with a type of disk; and
   a detector to receive the reflected light to detect an angle or the amount of the reflected light and to identify a recording density of the disk based upon the detected angle or the detected amount of the reflected light, wherein an angle of the reflector relative to the light source depends on the type of the disk.

22. A disk drive apparatus to receive a disk, comprising:
   a light source to generate light;
   a reflector to reflect the light; and
   a detector to receive the reflected light and to identify a type of the disk based upon the reflected light,
   wherein an angle of the reflector relative to the light source depends on the type of the disk and the detector comprises:
      a first detecting unit; and
      a second detecting unit,
   wherein the type of the disk is identified by comparing an amount of the reflected light received by the first detecting unit with an amount of the reflected light received by the second detecting unit.

23. The disk drive apparatus of claim 22, further comprising a comparing unit to compare the amount of the reflected light received by the first detecting unit with the amount of the reflected light received by the second detecting unit.

24. The disk drive apparatus of claim 20, wherein the optical detector identifies the type of the disk based upon an amount of the reflected light received by the detector.

25. A method to identify a type of a disk in a cartridge, comprising:
   reflecting light from a surface of the cartridge having a color applied thereto to reflect first and second particular amounts of light, the amounts of light being associated with the type of the disk;
   detecting the first and second amounts of the reflected light to detect an area, an angle, or a difference between the amounts of the reflected light; and identifying a recording density of the disk based upon the detected area, the detected angle, or the detected difference between the amounts of the reflected light.

26. The method of claim 25, wherein the detecting of the reflected light further comprises detecting the reflected light with a first detector and a second detector.

27. A method to identify a type of a disk in a cartridge, comprising:
reflecting light from a surface of the cartridge;
detecting the reflected light; and
identifying the type of the disk based upon the reflected light,
wherein the detecting of the reflected light further comprises detecting the reflected light with a first detector and a second detector, and
the identifying the type of the disk based upon the detected light further comprises comparing an amount of reflected light detected by the first detector with an amount of the reflected light detected by the second detector.

28. The method of claim 27, wherein the identifying the type of the disk comprises identifying the type of the disk based on an amount of the reflected light.

29. An optical disk cartridge to receive light from a light source, comprising:
a case which accommodates a disk having information accessible by the light; and
a colored reflector to reflect first and second amounts of the light, a difference between the first and second amounts and a color of the colored reflector being indicative of a type of the disk.

30. An optical disk cartridge to receive light from a light source, comprising:
a case which accommodates a disk having information accessible by the light; and
a reflector to reflect an amount of the light, that is associated with a color applied to the reflector, the amount being indicative of a type of the disk, wherein an angle of the reflector relative to the light source depends on the type of the disk.

31. The optical disk cartridge of claim 29, wherein an amount of the reflected light is indicative of the type of the disk.

32. An optical disk cartridge to be removably inserted into a disk drive to receive light from a light source, comprising:
a case which accommodates a disk having information accessible by the light;
a first reflector to reflect the light in a manner indicative of a type of the disk; and
a second reflector to reflect the light in a manner indicative of the type of the disk,
the first and second reflectors respectively being on opposite sides at the top and bottom of the disk cartridge, wherein a detector installed in the disk drive detects amounts of the light reflected from the first and second reflectors, the amounts being related to the manner indicative of a type of the disk, compares the amounts, and determines the type of the disk based on the comparison.

33. An optical disk cartridge to be removably inserted into a disk drive to receive light from a light source, comprising:
a case which accommodates a disk having information accessible by the light;
a first reflector to reflect the light in a manner indicative of a type of the disk; and
a second reflector to reflect the light in a manner indicative of the type of the disk,
the first and second reflectors respectively being at opposite side surfaces of the disk cartridge, wherein a detector installed in the disk drive detects amounts of the light reflected from the first and second reflectors, the amounts being related to the manner indicative of a type of the disk, compares the amounts, and determines the type of the disk based on the comparison.

34. A disk cartridge to accommodate a disk as an information recording medium, comprising:
a case to rotatably accommodate the disk;
a light source to generate light;
an optical detector; and
a reflector disposed on the case, the reflector reflecting first and second amounts of the light from the light source to the optical detector to allow a recording density of the disk to be identified based on a difference in the amounts of the reflected light.

35. A disk cartridge to accommodate various types of disks as information recording mediums, comprising:
a case to rotatably accommodate the disk;
a light source to generate light;
an optical detector; and
a reflector, having a color applied thereto, disposed on the case, the reflector reflecting first and second amounts of the light from the light source to the optical detector in accordance with the color applied to the reflector, the amounts being associated with a type of disk to allow the type of the disk to be identified based on a difference in the amounts of the reflected light.

* * * * *